US012339631B2

(12) United States Patent
Putman et al.

(10) Patent No.: US 12,339,631 B2
(45) Date of Patent: *Jun. 24, 2025

(54) DYNAMIC MONITORING AND SECURING OF FACTORY PROCESSES, EQUIPMENT AND AUTOMATED SYSTEMS

(71) Applicant: Nanotronics Imaging, Inc., Cuyahoga Falls, OH (US)

(72) Inventors: Matthew C. Putman, Brooklyn, NY (US); John B. Putman, Celebration, FL (US); Joanna Lee, Brooklyn, NY (US); Damas Limoge, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,532

(22) Filed: Apr. 8, 2024

(65) Prior Publication Data

US 2024/0329609 A1    Oct. 3, 2024

Related U.S. Application Data

(63) Continuation of application No. 18/329,295, filed on Jun. 5, 2023, now Pat. No. 11,953,863, which is a
(Continued)

(51) Int. Cl.
G05B 13/02    (2006.01)
(52) U.S. Cl.
CPC .................................. G05B 13/027 (2013.01)
(58) Field of Classification Search
CPC .................................................. G05B 13/027
See application file for complete search history.

(56) References Cited

U.S. PATENT DOCUMENTS 10,879,831 B1    12/2020   Nagel et al.
2013/0332773 A1  12/2013   Yuan et al.
(Continued)

FOREIGN PATENT DOCUMENTS

TW    200614093    5/2006
TW    201925937    7/2019
TW    202122946    6/2021

OTHER PUBLICATIONS

International Search Report and Written Opinion for Application No. PCT/US2023/068606, mailed Jul. 24, 2023, 9 pages.
(Continued)

Primary Examiner — Christopher E. Everett
(74) Attorney, Agent, or Firm — DLA PIPER LLP (US)

(57) ABSTRACT

A training set that includes at least two data types corresponding to operations and control of a manufacturing process is obtained. A deep learning processor is trained to predict expected characteristics of output control signals that correspond with one or more corresponding input operating instructions. A first input operating instruction is received from a first signal splitter. A first output control signal is received from a second signal splitter. The deep learning processor correlates the first input operating instruction and the first output control signal. Based on the correlating, the deep learning processor determines that the first output control signal is not within a range of expected values based on the first input operating instruction. Responsive to the determining, an indication of an anomalous activity is provided as a result of detection of the anomalous activity in the manufacturing process.

20 Claims, 9 Drawing Sheets

Related U.S. Application Data continuation of application No. 17/812,879, filed on Jul. 15, 2022, now Pat. No. 11,669,058.

(56) References Cited

U.S. PATENT DOCUMENTS

| | | |
|---|---|---|
| 2014/0351642 A1 | 11/2014 | Bates et al. |
| 2019/0219994 A1 | 7/2019 | Yan et al. |
| 2020/0096998 A1 | 3/2020 | Cella et al. |
| 2021/0026334 A1 | 1/2021 | Mazur et al. |
| 2021/0080941 A1 | 3/2021 | Entzminger et al. |

OTHER PUBLICATIONS

Office Action for Taiwan Patent Application No. 112125479, mailed May 17, 2024, 6 pages.
Office Action for Taiwan Patent Application No. 112125479, mailed Feb. 3, 2025, 6 pages.

DYNAMIC MONITORING AND SECURING OF FACTORY PROCESSES, EQUIPMENT AND AUTOMATED SYSTEMS

CROSS-REFERENCE TO RELATED APPLICATIONS

This is a continuation of U.S. application Ser. No. 18/329,295, filed Jun. 5, 2023, which is a continuation of U.S. application Ser. No. 17/812,879, filed Jul. 15, 2022, now U.S. Pat. No. 11,669,058, issued Jun. 6, 2023, which are incorporated by reference in their entireties.

FIELD OF DISCLOSURE

The present disclosure generally relates to systems, apparatuses and methods for dynamically monitoring and securing factory processes, equipment, and automated systems against attacks that can interfere with operation and control of a factory.

BACKGROUND

Malware attacks against various environments (e.g., a factory, a commercial building) are proliferating and becoming increasingly sophisticated. Such malware attacks are often capable of gaining access to isolated and closed computer networks, as well as machines connected to external networks (e.g., 4G and 5G networks). In many instances, malware attacks can target and impact the operation and control of process, equipment, and automated systems included in a factory.

Malware can take many forms including, but not limited to, computer viruses, worms, Trojan horses, spyware, backdoors, faulty components, etc. Malware can be designed to cause subtle or minor changes to the operation and control of factories and are often able to evade many information technology (IT) security processes in place.

While some changes to the operation and control of factories caused by malware may be subtle, the impact of the malware attacks on the output of factories can be severe. In particular, malware attacks can be directed at programmable logic controllers or other controllers that control or monitor various systems in a factory. For instance, malware can alter controller programming to instruct equipment to operate at a faster or slower rate/speed than prescribed, by introducing rapid or frequent changes to control parameters, or by increasing or decreasing the control parameters at greater increments than prescribed.

Additionally, malware attacks to controllers can provide false feedback to the controllers that the equipment is operating at normal levels. As a result, the controllers can receive feedback that everything is operating normally, which can cause alarms or notifications for many IT security solution processes to not be activated. Thus, the equipment can continue to operate at abnormal levels until the equipment or the output becomes irreversibly damaged and the yield noticeably diminished.

SUMMARY

In some embodiments, a computer-implemented method is disclosed herein. A training set that includes at least two data types corresponding to operations and control of a manufacturing process is obtained. The training data set includes at least a set of input operating instructions and a set of output control signals. A deep learning processor is trained to predict expected characteristics of output control signals that correspond with one or more corresponding input operating instructions. A first input operating instruction is received from a first signal splitter. A first output control signal is received from a second signal splitter. The deep learning processor correlates the first input operating instruction and the first output control signal. Based on the correlating, the deep learning processor determines that the first output control signal is not within a range of expected values based on the first input operating instruction. Responsive to the determining, an indication of an anomalous activity is provided as a result of detection of the anomalous activity in the manufacturing process.

In some embodiments, a non-transitory computer-readable storage medium is disclosed herein. The non-transitory computer-readable storage medium stores thereon executable instructions that, as a result of being executed by one or more processors of a computer system, cause the computer system to: obtain a training data set that includes at least a set of input operating instructions, a set of output control signals, and a set of measured control values, train a deep learning processor to correlate the set of output control signals that with one the set of input operating instructions, further train the deep learning processor to correlate the set of measured control values with the set of output control signals and/or the set of input operating instructions, receive, from a first signal splitter, a first input operating instruction, receive, from a second signal splitter, a first output control signal, receive, from a third signal splitter, a first control value, determine whether the first output control signal is within a range of values specified by the first input operating instruction, responsive to determining that the first output control signal is within the range of values specified by the first input operating instruction, correlate the first control value with the first input operating instruction and/or the first output control signal, determine that the first control value is outside of an expected range of values specified by the first input operating instruction and the first output control signal, and responsive to determining, provide an indication of anomalous activity.

In some embodiments, a system is disclosed herein. The system includes one or more processors and a memory. The memory stores thereon instructions that, as a result of being executed by the one or more processors, cause the system to obtain a training data set that includes at least a set of input operating instructions, a set of output control signals, and a set of measured control values, train a deep learning processor to correlate the set of measured control values with the set of output control signals and/or the set of input operating instructions, receive a first input operating instruction, a first output control signal, and a first control value, correlate the first control value with the first input operating instruction and/or the first output control signal, determine that the first control value is outside an expected range of values specified by the first output control signal and the first input operating instruction, and responsive to the determining, provide an indication of an anomalous activity as a result of detection of the anomalous activity.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
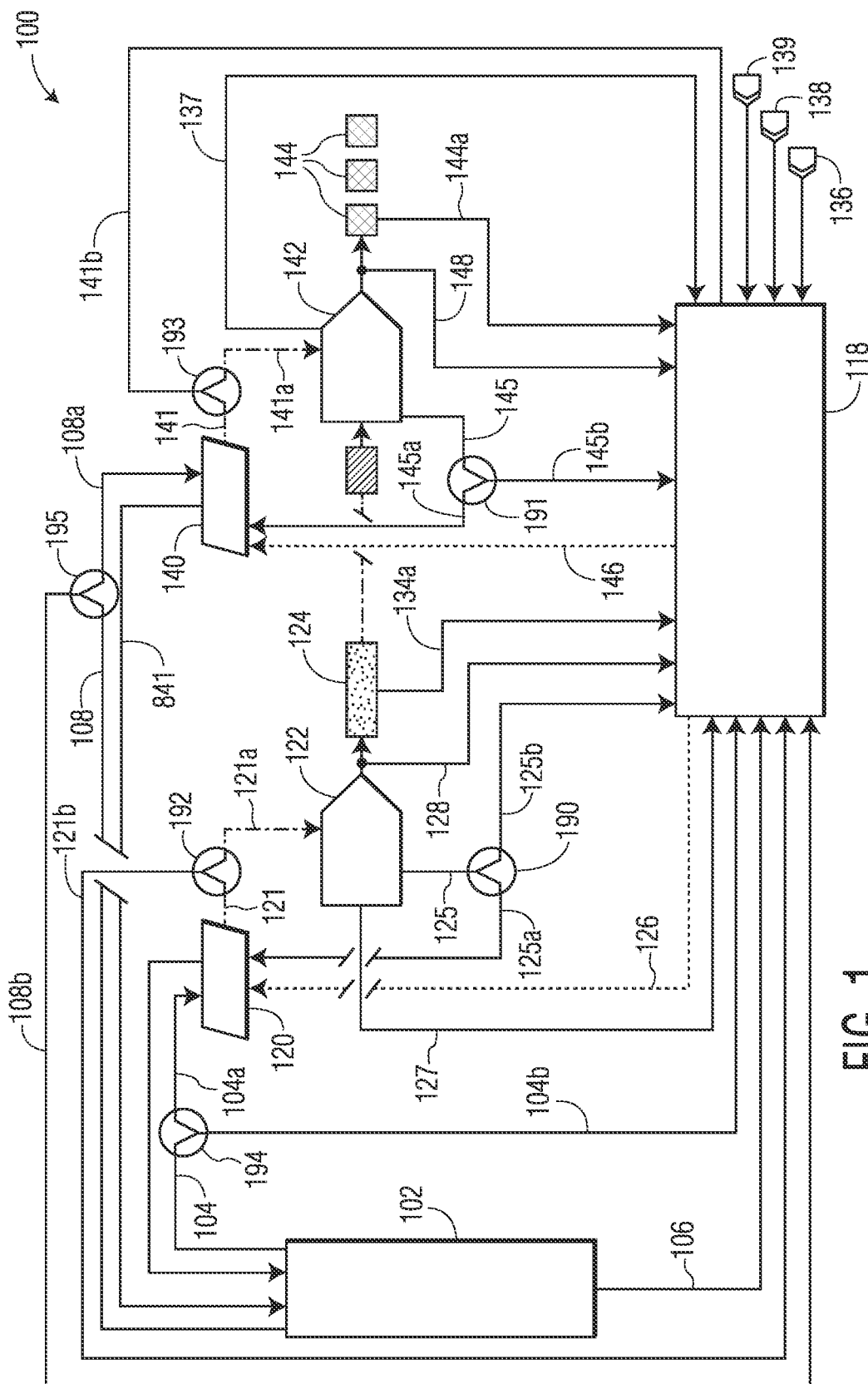
FIG. 1 is a block diagram illustrating a manufacturing system, according to example embodiments.

Manufacturing in a manufacturing environment (e.g., a factory) can include various processes to control manufacturing components (e.g., machines, control systems) in the environment. The processes controlling components in the factory can be vulnerable to attacks from malware, which, if not promptly identified, can cause interference or non-repairable damage to equipment or a manufacturing yield in the factory.

In particular, components enabling manufacturing in a factory can be complex and can include various process stations (or "stations") that process raw components to produce a final output product. Various process stations can receive an input for processing and output an intermediate output that is passed along to one or more subsequent (downstream) processing stations for additional processing. The final process station can obtain an input for processing and can output the final output.

Each process station can include one or more tools/equipment that are configured to perform a set of process steps on the raw materials or any intermediate output obtained from another processing station. Examples of a processing station can include, but are not limited to, conveyor belts, injection molding presses, cutting machines, die stamping machines, extruders, CNC mills, grinders, assembly stations, 3D printers, robotic devices, quality control and validation stations, etc. Example process steps can include, but are not limited to, transporting outputs from one location to another (as performed by a conveyor belt); feeding material into an extruder, melting the material and injecting the material through a mold cavity where it cools and hardens to the configuration of the cavity (as performed by an injection molding presses); cutting material into a specific shape or length (as performed by a cutting machine); pressing material into a particular shape (as performed by a die stamping machine), etc.

In manufacturing processes, process stations can run in parallel or in series. When operating in parallel, a single process station can send its intermediate output to more than 1 stations (e.g., 1 to N stations), and a single process station can receive and combine intermediate outputs from more than one to N stations. Moreover, a single process station can perform the same process step or different process steps, either sequentially or non-sequentially, on the received raw material or intermediate output during a single iteration of a manufacturing process.

Operation of each process station can be governed by one or more process controllers. In some implementation, each process station has one or more process controllers (referred to herein as "a station controller") that are programmed to control the operation of the process station (the programming algorithms referred to herein as "control algorithms"). However, in some aspects, a single process controller may be configured to control the operations of two or more process stations. One example of a station controller is a Programmable Logic Controller (PLC). A PLC can be programmed to operate manufacturing processes and systems. The PLC or other controller can receive information from connected sensors or input devices, process the data and generate outputs (e.g., control signals to control an associated process station) based on pre-programmed parameters and instructions.

An operator or control algorithm can provide the station controller with station controller setpoints (or "setpoints" or "controller setpoints" or CSPs) that represent a desired single value or range of values for each control value. The values that can be measured during the operation of a station's equipment or processes can either be classified as control values or station values. A value that is controlled by a station controller can be classified herein as control values, the other measured values will be classified herein as station values. Examples of control and/or station values include, but are not limited to: speed, temperature, pressure, vacuum, rotation, current, voltage, power, viscosity, materials/resources used at the station, throughput rate, outage time, noxious fumes, the type of steps and order of the steps performed at the station. Whether a measured value is classified as a control value or a station value can depend on the particular station and whether the measured value is controlled by a station controller or is simply a byproduct of the operation of the station. During the manufacturing process, control values can be provided to a station controller, while station values may not be provided to a controller.

The control algorithms can also include instructions for monitoring control values, comparing control values to corresponding setpoints and determining what actions to take when the control value is not equal to (or not within a defined range of) a corresponding station controller setpoint. For example, if the measured present value of the temperature for the station is below the setpoint, then a signal may be sent by the station controller to increase the temperature of the heat source for the station until the present value temperature for the station equals the setpoint.

Many process controllers used in the manufacturing process to control a station may be limited, as such controllers follow static algorithms (e.g., on/off control, PI control, PID control, Lead/Lag control) for prescribing what actions to take when a control value deviates from a setpoint.

One or more sensors can be included within or coupled to each process station. These can be physical or virtual sensors that exist in a manufacturing process unrelated to the operation of deep learning processor, as well as any new sensors that can be added to perform any additional measurements required by deep learning processor. Sensors can be used to measure values generated by a manufacturing process such as: station values, control values, intermediate and final output values. Example sensors can include, but are not limited to: rotary encoders for detecting position and speed; sensors for detecting proximity, pressure, temperature, level, flow, current and voltage; limit switches for detecting states such as presence or end-of-travel limits.

A sensor as described herein can include both a sensing device and signal conditioning. For example, the sensing device reacts to the station or control values and the signal conditioner translates that reaction to a signal that can be used and interpreted by deep learning processor or the station controller. Example of sensors that react to temperature are RTDs, thermocouples and platinum resistance probes. Strain gauge sensors react to pressure, vacuum, weight, change in distance among others. Proximity sensors react to objects when they are within a certain distance of each other or a specified tart. With all of these examples, the reaction must be converted to a signal that can be used by a station controller or deep learning processor. In many cases the signal conditioning function of the sensors produce a digital signal that is interpreted by the station controller. The signal conditioner can also produce an analog signal or TTL signal among others. Virtual sensors also known as soft sensors, smart sensors or estimators include system models that can receive and process data from physical sensors.

A process value, as used herein refers to a station value or control value that is aggregated or averaged across an entire series of stations (or a subset of the stations) that are part of the manufacturing process. Process values can include, for example, total throughput time, total resources used, average temperature, average speed.

In addition to station and process values, various characteristics of a process station's product output (i.e., intermediate output or final output) can be measured, for example: temperature, weight, product dimensions, mechanical, chemical, optical and/or electrical properties, number of design defects, the presence or absence of a defect type. The various characteristics that can be measured, will be referred to generally as "intermediate output value" or "final output value." The intermediate/final output value can reflect a single measured characteristic of an intermediate/final output or an overall score based on a specified set of characteristics associated with the intermediate/final output that are measured and weighted according to a predefined formula.

Mechanical properties can include hardness, compression, tack, density and weight. Optical properties can include absorption, reflection, transmission, and refraction. Electrical properties can include electrical resistivity and conductivity. Chemical properties can include enthalpy of formation, toxicity, chemical stability in a given environment, flammability (the ability to burn), preferred oxidation states, pH (acidity/alkalinity), chemical composition, boiling point, vapor point). The disclosed mechanical, optical, chemical and electrical properties are just examples and are not intended to be limiting.

Malware can be designed to disrupt the proper functioning of the operation and control of a factory in a number of ways. For instance, malware executing on a computing device may cause a station controller to send control signals to its associated process station(s) to operate at levels that will be harmful to the equipment itself or its output. Additionally, this malware may cause fluctuating control values at a harmful rate or at harmful increments. Further, computing devices executing malware or other malicious applications may provide false feedback to the station controller, so that the controller is not aware of harmful conditions at an associated process station and, thus, may not make needed adjustments. Malware can also be designed to target one or more sensors to manipulate or corrupt the measured values generated by a manufacturing process. Malware can also be designed to intercept or monitor data generated throughout the manufacturing process or data communicated among components involved in the manufacturing process such as station processors, controllers, data processing servers, sensors.

While a range of IT solutions such as antivirus software, firewalls and other strategies exist to protect against the introduction of malware, malware has become more sophisticated at evading such solutions. The embodiments as described herein focus on dynamically monitoring measured values and outputs from the operation and control of the factory processes, equipment and automated systems, and identifying disruptions, or any unexpected changes, whether due to the presence of malware or other harmful or unexpected system changes. Although various techniques (e.g., Statistical Process Control (SPC)) can provide alerts when the operation and control of factories exceed certain limits, they generally do not provide alerts when the operation and control of factories are in control and are limited in their ability to analyze trends across many stations or the impact of several stations together.

Accordingly, the present embodiments can provide mechanisms for securing factory processes, equipment and automated systems by dynamically detecting anomalous activity, however subtle, before damage to the manufacturing process occurs. The present embodiments can also provide mechanisms that monitor the inputs to and outputs of each station (and their associated controllers) individually, and together with the inputs to and outputs of other stations (and their associated controllers) in the manufacturing process, to dynamically identify anomalous activity. In some instances, anomalous activity can be caused by the introduction of malware, but it is understood that anomalous activity can refer more generally to other causes, beyond malware, that interfere with the control and operation of factories.

One or more techniques provided herein present a deep learning processor based on machine-learning (ML) or artificial intelligence (AI) models to evaluate control values, station values, process values, data output, and/or intermediate and final output values (collectively, "response data") along with associated station controller setpoints, functional priors, experiential priors, and/or universal inputs to identify any variation from typical factory control and operation. As understood by those of skill in the art, machine learning based techniques can vary depending on the desired implementation, without departing from the disclosed technology. For example, machine learning techniques can utilize one or more of the following, alone or in combination: hidden Markov models; recurrent neural networks; convolutional neural networks (CNNs); deep-learning; Bayesian symbolic methods; reinforcement learning, general adversarial networks (GANs); support vector machines; image registration methods; long-term, short term memory (LSTM); and the like.

Machine learning models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. The machine learning models can be based on supervised and/or unsupervised methods.

As noted above, operating instructions can be provided from a data processing computer to one or more controllers to monitor or control various aspects of process stations. For example, as shown in FIG. 1, data processing server 102 can provide an operating instruction to a station controller (e.g., 120 or 140). The station controller, in turn, can forward the operating instructions to corresponding process stations (e.g., 122 or 142).

As an example, the operating instructions sent from a data processing server to a controller may instruct the controller to set a temperature at a process station to 150 deg C. To achieve the desired set temperature, the station controller may output a fixed voltage (e.g., an output control signal) to a heating element in a corresponding process station such that the temperature is maintained at 150 deg C. In this example, the controller will only vary the output voltage according to the changes indicated by new operating instructions provided by a data processing server.

Under normal conditions, the input instructions (e.g., instructions from the data processing server to the controller) and output control signals (e.g., instructions form the controller to the process station) convey the same data. However, in the event a controller is corrupted or infected with malware, the instructions may be distorted. The controller corrupted or infected with malware may modify the input operating instructions to generate modified output control signal. For example, the output control signals can modify the fixed output voltage (e.g., the output control signal) sent from the controller to the heating element in a process station. Such modifications to the output control signal can cause damage to components in process stations, as described herein.

The present embodiments relate to a deep learning processor determining a relationship between input operating instructions and output control signals provided by nodes in a network and generating an alert if the relationship deviates from a threshold variance in instructions.

For instance, a deep learning processor can identify input operating instructions provided by a data processing server (e.g., via a first splitter forwarding the input operating instructions to both a controller and the deep learning processor). The deep learning processor can further obtain output instructions (e.g., an output control signal) provided by the controller to a process station (e.g., via a second splitter forwarding the output control signal to both the process station and the deep learning processor). The deep learning processor can correlate the input operating instructions with the output control signal to determine whether the output control signal deviates from the input operating instructions. Responsive to determining that the output control signal deviates from the input operating instructions, an alert can be generated or another action can be taken, such as to isolate a controller from the factory environment or request generation of new input operating instructions by the data processing server.

In an example embodiment, a computer-implemented method is provided. The computer-implemented method can include obtaining a training data set that includes at least two data types corresponding to operations and control of a manufacturing process. The training data can include at least a set of input operating instructions and a set of output control signals. The computer-implemented method can also include training a deep learning processor to predict expected characteristics of output control signals that correspond with one or more corresponding input operating instructions. For example, a training model 210 can train a machine learning model 212 to generate a fully trained model 214 as described in FIG. 2.

The computer-implemented method can also include receiving, from a first signal splitter (e.g., 194), a first input operating instruction and receiving, from a second signal splitter (e.g., 192), a first output control signal.

In some embodiments, the first signal splitter is disposed between a data processing server and a first controller in a manufacturing environment. The first input operating instruction can be generated by the data processing server. Further, a first duplicated input signal instance can be forwarded to the deep learning processor and a second duplicated input signal instance can be forwarded to the first controller. The second signal splitter can be disposed between the first controller and a first process station in the manufacturing environment. The first output control signal can be generated by the first controller. A first duplicated output signal instance can be forwarded to the deep learning processor and a second duplicated output signal instance can be forwarded to the first process station. In some instances, the first input operating instruction may include an instruction for the first controller to control a temperature of a heating element in the first process station, and wherein the first output control may include a fixed output voltage.

The computer-implemented method can also include correlating, by the deep learning processor, a first control value with a first input control signal and a first output control signal to determine whether the first control value is within a range of expected values. In some embodiments, the training data further includes a set of control values measured at the process stations. The method can further include training the deep learning processor to correlate the control values the one or more output control signals and/or one or more corresponding input operating instructions.

In some embodiments, the method can include receiving, from a third signal splitter, a first control value. The method can also include correlating, by the deep learning processor, the first control value with the first input operating instruction and the first output control signal to determine whether the first control value is within an expected range of values. The method can also include, responsive to determining that the first control value is outside the range of expected values, providing the indication of the anomalous activity as the result of detection of the anomalous activity in the manufacturing process.

Using a specific example, a first input operating instruction may instruct a station controller 120 to set the temperature of a station to 150 deg C. To achieve the desired set temperature the station controller 120 may output a fixed voltage (i.e., the first output control signal) to a heating element in station 122 so that the temperature is maintained at 150 deg C. In this example, station controller 120 may only vary this voltage according to the changes indicated by the input operating instructions. In normal behavior, the control value measured at station 122 should indicate a temperature of around 150 deg C. If the control value is not as predicted (i.e., outside a range of expected values), an abnormal condition is indicated.

In some embodiments, the third signal splitter is disposed between a measuring component in the process station and the first controller. The first control value or control values can be generated by the measuring component. A first duplicated instance of the first control value can be forwarded to the deep learning processor and a second duplicated instance of the first control value can be forwarded to the first controller.

In some embodiments, the method can include identifying, in response to detecting the anomalous activity, a component that is a source of the anomalous activity. The indication of the anomalous activity can be modified to identify the component that is the source of the anomalous activity.

FIG. 1 is a block diagram illustrating a manufacturing system 100, according to example embodiments. As shown, manufacturing system 100 may include a deep learning processor 118 that can be configured to dynamically monitor for anomalous activity of any number of (referred to herein by "N") processing stations in a manufacturing process. In FIG. 1, the N processing stations of a manufacturing process are represented by process stations 122 and 142. The process stations can operate serially or in parallel.

Setpoints, algorithms, initial input and operating instructions, system and process updates and other control inputs to station controllers 120 and 140 (input operating instructions 104 and 108, respectively), can be provided by a local or central data processing server 102. In some embodiments, such process can be performed manually by an operator. Data processing server 102, in some embodiments, can also receive data output generated by station controllers 120 and 140, as well as data generated by sensors coupled to or within process stations 122 or 142, or from independent sensors 127 and 137. Data output, includes, but is not limited to: (i) data generated during the manufacturing process (e.g., data logs coupled to physical sensors, process station components, or station controller components); (ii) data received by or transmitted from each process station or station controller and (iii) data communications and data generation patterns of individual or any number of process stations or station controllers (e.g., high data volumes, low data volumes, erratic data volumes, unusual data communication or data generation based on time of day, origin or destination of the data). In further embodiments, data processing server 102 can receive all response data. The data output can be provided to deep learning processor 118 (step 106). In some embodiments, data processing server 102 can also receive data from related manufacturing processes occurring in remote geographic locations and provide such data to deep learning processor 118. Not all data inputs to data processing server 102 are shown in FIG. 1.

Universal inputs 136, experiential priors 139, functional priors 138, and values from each of the N stations (e.g., 122 and 142) can be provided to deep learning processor 118. In other embodiments, any number of additional deep learning processors can be used and configured to dynamically monitor for anomalous activity of N processing stations in a manufacturing process.

Functional priors, as used herein, refers to information relating to the functionality and known limitations of each process station, individually and collectively, in a manufacturing process. The specifications for the equipment used at the process station are all considered functional priors. Example functional priors can include, but are not limited to: a screw driven extruder that has a minimum and maximum speed that the screw can rotate; a temperature control system that has a maximum and minimum temperature achievable based on its heating and cooling capabilities; a pressure vessel that has a maximum pressure that it will contain before it explodes; a combustible liquid that has a maximum temperature that can be reached before combustion. Functional priors can also include an order in which the individual stations that are part of a manufacturing process perform their functions.

Experiential priors, as used herein, refers to information gained by prior experience with, for example performing the same or similar manufacturing process; operating the same or similar stations; producing the same or similar intermediate/final outputs; root cause analysis for defects or failures in final outputs for the manufacturing process and solutions. In some embodiments, experiential priors can include acceptable final output values or unacceptable final output values. Acceptable final output values refer to an upper limit, lower limit or range of final output values where the final output is considered "in specification." In other words, acceptable final output values describe the parameters for final output values that meet design specification, i.e., that are in-specification. Conversely, unacceptable final output values refer to upper/lower limits or range of final output values where the final output is "not in specification" (i.e., describe the parameters for final output values that do not meet design specifications). For example, based on prior experience it might be known that an O-ring used to seal pipes, will only seal if it has certain compression characteristics. This information can be used to establish acceptable/unacceptable compression values for an O-ring final output. In other words, all O-ring final outputs that have acceptable compression values are able to perform their sealing functionality, while all O-ring final outputs that have unacceptable compression values cannot perform their scaling functionality. Acceptable intermediate output values, which can be defined per station, refer to upper/lower limits or a range of intermediate output values that define the parameters for an intermediate output that can ultimately result in a final output that is in specification, without requiring corrective action by other stations. Unacceptable intermediate output values, which can also be defined by station, refer to upper/lower limits or range of intermediate output values that define the parameters for an intermediate output that will ultimately result in a final output that is not in specification, unless corrective action is taken at another station. Similarly, acceptable/unacceptable parameters can be defined for other variables relating to the manufacturing process:

Acceptable control, station or setpoint values can include upper or lower limits or range of values, defined per station for each type of control or station value and setpoint, that define the parameters for, or are an indication of, satisfactory station performance. Satisfactory performance refers to (1) the performance of the station itself (e.g., throughput rate is not too slow, there is no outage, noxious fumes or other harmful condition, resources are being used efficiently); and/or (2) control, station or setpoint values that cause an in specification final output to be achievable, without requiring corrective action by other stations.

Unacceptable control, station or setpoint values can include upper or lower limits or range of values, defined per station for each type of control, station or setpoint value, that define the parameters for, or are an indication of, unsatisfactory station performance. Unsatisfactory performance refers to (1) the performance of the station itself (e.g., throughput rate is too slow, an outage, noxious fumes or other harmful station condition, resources are not being used efficiently); and/or (2) control, station or setpoint values that cause an in specification final output to be unachievable, unless corrective action by other stations is taken.

Acceptable process performance can include upper or lower limits or range of values for each type of process value, that define the parameters for, or are an indication of, satisfactory performance of the manufacturing process. Satisfactory performance refers to (1) the functioning of the process itself (e.g., throughput rate is not too slow, there is no outage, noxious fumes or other harmful condition, resources are being used efficiently); and/or (2) process values that cause an in specification final output to be achievable.

Unacceptable process performance upper or lower limits or range of values, defined for each type of process value, that define the parameters for, or are an indication of, unsatisfactory process performance. Unsatisfactory performance refers to (1) the process performance itself (e.g., throughput rate is too slow, there is an outage, noxious fumes or other harmful condition, resources are not being used efficiently); and/or (2) process values that cause an in specification final output to be unachievable.

Experiential priors can also include acceptable and unacceptable manufacturing performance metrics. Manufacturing performance metrics calculate one or more aspects of multiple iterations of the manufacturing process (e.g., production volume for a specified time period, production downtime for a specified time period, resources used for a specified time period or a specified number of final outputs, percentage of products not in specification for a specified time period, production volume for a particular operator, material costs associated with a specified number of final outputs).

Universal inputs, as used herein, refers to a value that is not specific to a particular process station, but rather to an aspect of the entire manufacturing process, for example, a date, time of day, ambient temperature, humidity or other environmental conditions that might impact the manufacturing process, operator, level of skill of the operator, raw materials used in the process, raw material specifications such as color, viscosity, particle size, among other characteristics that are specific to the raw material, specific lot numbers and cost of raw materials, tenure of the equipment/tools for each station, identifying information such as production work order numbers, batch numbers, lot numbers, finished product numbers and finished product serial numbers.

Note, that the examples provided for each of functional priors, experiential priors and universal inputs represent one way to classify these examples, other suitable classifications can be used. For example, another way to classify the input that is provided to deep learning processor 118 is: pre-process inputs (e.g., experiential priors, functional priors, material properties, scheduling requirements); in-process inputs (e.g., universal inputs, control values, station values, intermediate values, final output values, process values); post-process inputs (e.g., manufacturing performance metrics and other analytics). Further, the functional and experiential priors can be dynamically updated throughout the manufacturing process.

Each process station can be controlled by one or more associated station controllers (e.g., station controller 120 controls process station 122 and station controller 140 controls process station 142). In an embodiment, a single station controller can control multiple process stations or control multiple control values associated with a single process station. In some embodiments, deep learning processor 118 can provide control inputs (represented by 126 and 146) based on predictive process control or pre-programmed algorithms to each process station controller. Predictive process control is described in U.S. patent application Ser. No. 16/663,245 entitled "Predictive Process Control for a Manufacturing Process," which is hereby incorporated by reference herein in its entirety. In other embodiments, the deep learning processor does not provide any inputs to the station controller.

A signal conditioner, for example a signal splitter, amplifier, digital to analog converter, analog to digital converter can be included to divide the control value signals so that the control values are sent both to deep learning processor 118 and the relevant station controller (e.g., 120 or 140). The control values can be analog or digital signals. Further, a signal conditioner, according to some embodiments, can be included within deep learning processor and can convert all analog values to digital values or perform other conditioning. Each station controller can provide one or more control signals (e.g., 121 and 141) that provides commands for regulating a station's control values (e.g., control values 125 and 145). Each station may output an intermediate output (e.g., 124 and 144), that has an intermediate output value (134*a* and 144*a* respectively). All intermediate output values and the final output value (e.g., 144, if process station 142 is the final process station in the process) from the processing stations may be provided to deep learning processor 118. Each station may also output station values (e.g., 128 and 148) that can be provided to deep learning processor 118. FIG. 1 also illustrates that intermediate output 124 may be sent to one or more subsequent stations, which can represent a single station or any number of multiple stations. Station 142, as shown in FIG. 1, can receive an intermediate input from any number of prior stations. In some embodiments, the setpoint values used by the station controllers (e.g., station controllers 120 and 140) can be sent to deep learning processor 118. Further, values relating to the manufacturing process can be measured by independent sensors (e.g., independent sensor 127 and 137) and provided to deep learning processor 118.

It is understood that the communication among deep learning processor 118, the station controllers and process stations can use any suitable communication technologies that provide the ability to communicate with one or more other devices, and/or to transact data with a computer network. By way of example, implemented communication technologies can include, but are not limited to: analog technologies (e.g., relay logic), digital technologies (e.g., RS232, ethernet, or wireless), network technologies e.g., local area network (LAN), a wide area network (WAN), the Internet, Bluetooth technologies, Nearfield communication technologies, Secure RF technologies, and/or any other suitable communication technologies.

In some embodiments, operator inputs can be communicated to deep learning processor 118, and/or any of the station controllers or process stations using any suitable input device (e.g., keyboard, mouse, joystick, touch, touchscreen, etc.).

As noted above, in some embodiments, an input operating instruction and output control signals can be compared to identify whether the output control signal is outside an expected range of values as determined by a trained model. For example, if an output control signal is determined to be anomalous, the controller (e.g., 120, 140) can be corrupted (e.g., with malware).

FIG. 1 illustrates several splitters 192, 193, 194, 195. Each splitter 192, 193, 194, 195 can duplicate an obtained signal and forward each instance of the duplicated signal to a corresponding endpoint. For example, splitter 194 can obtain an input operating instruction 104 from data processing server 102 and duplicate the instruction. The splitter 194 can further transmit the duplicated instances of the input operating instruction to station controller 120 and deep learning processor 118. For example, splitter 194 can send a first duplicated instance of the input operating instruction 104*a* to station controller 120; splitter 194 can send a second duplicated instance of the input operation instruction 104*b* to deep learning processor 118. As another example, splitter 192 can obtain an output control signal 121 from station controller 120 and duplicate the instruction. The splitter 192 can further transmit the duplicated instances of the output control signal to process station 122 and deep learning processor 118. For example, splitter 192 can transmit a first duplicated instance of output control signal 121*a* to process station 122; splitter 192 can transmit a second duplicated instance of output control signal 121*b* to deep learning processor 118.

Similarly, splitter 195 can obtain an input operating instruction 108 from data processing server 102 and duplicate the instruction. The splitter 195 can further transmit the duplicated instances of the input operating instruction to station controller 140 and deep learning processor 118. For example, splitter 195 can send a first duplicated instance of the input operating instruction 108*a* to station controller 140; splitter 195 can send a second duplicated instance of the input operation instruction 108*b* to deep learning processor 118. As another example, splitter 193 can obtain an output control signal 141 from station controller 140 and duplicate the instruction. The splitter 193 can further transmit the duplicated instances of the output control signal to process station 142 and deep learning processor 118. For example, splitter 193 can transmit a first duplicated instance of output control signal 141*a* to process station 142; splitter 193 can transmit a second duplicated instance of output control signal 141*b* to deep learning processor 118.

In some embodiments, any of the components as described with respect to FIG. 1 can include part of a supervisory control and data acquisition (SCADA) system. A SCADA system can include software and hardware elements that allow industrial entities to control industrial processes locally or at remote locations, monitor, gather, and process real-time data, directly interact with devices such as sensors, valves, pumps, motors, and more through human-machine interface (HMI) software, record events into a log file, etc.

The controllers as described herein can include logic controllers or automation controllers to control various aspects of process stations. For example, a controller can include a programmable logic controller (PLC) that may include a digital computer used for automation of electromechanical processes. As another example, the controller can include a remote terminal unit (RTU) that may include a microprocessor-controlled electronic device that interfaces objects in the physical world to a distributed control system or a SCADA system by transmitting telemetry data to the system and/or altering the state of connected objects based on control messages received from the system. As another example, the controller can include a programmable automation controller (PAC) that includes an automation system architecture composed of a number of computer-based software applications that can include human machine interface (HMI) functions, asset management, historian, advanced process control (APC), and others. A PAC can be used with applications with extensive process control requirements, as PACs can handle analog I/O and related control functions. A PAC can provide greater flexibility in programming, larger memory capacity, better interoperability, and more features and functions in general. Data collected by a SCADA system can be stored by a data storage system (e.g., a data historian providing a program or a set of time-series database applications that stores and retrieve process data).

In some embodiments, deep learning processor 118 can include a model (e.g., an AI model) trained on input operating instructions (IOI) and output control signals (OCS). For example, station controller 120 can control the temperature of process station 122. The input operating instructions may instruct station controller 120 to set temperature to 150 deg C. To achieve the desired set temperature the station controller may output a fixed voltage (the Output Control Signal) to a heating element in station 122 so that the temperature is maintained at 150 deg. In this example, station controller 120 may only vary this voltage according to the changes indicated by the input operating instructions.

The deep learning processor 118 can be trained that the input operating instructions are intentionally varied so that a range of temperatures are specified. Each of the variations can result in a corresponding output voltage (Output Control Signal). The model can correlate the Input Instruction to the Output Signal. If the Output Signal varies from an expected range of signals, then abnormal behavior can be identified, and an alert can be generated.

In some embodiments, the deep learning processor 118 may be trained to correlate an input operating instruction, an output control signal, and a control value 125 that is measured by one or more sensors in a process station 122 to determine whether the control value is outside of a range of expected values. For example, an output control signal specifying a temperature to maintain at the process station 122 can be provided from a station controller 120 to a component (e.g., heating element) at the process station 122. A sensor (e.g., a temperature sensor) at the process station (e.g., 122) can measure the control value (e.g., a temperature) at the process station 122.

For example, a sensor at process stations 122, 142 can measure control values at process stations 122, 142, respectively. Splitters 190, 191 can obtain the control values (e.g., 125, 245) and can duplicate instances of the control value signals. A first instance (e.g., 125*b*, 145*b*) of the duplicated control value can be forwarded to the deep learning processor 118. A second instance (e.g., 125*a*, 145*a*) of the duplicated control value can be forwarded to corresponding station controllers 120, 140 for controlling metrics in the process stations (e.g., 122, 142). The deep learning processor 118 can correlate the input operating instructions 104*b*, 108*b*, the output control signals 121*b*, 141*b*, and the control values 125*b*, 145*b* obtained from the process stations 122, 142 to determine whether any component in the process station (e.g., sensors) are corrupted.

The control values may be measured by a smart sensor or a standard temperature sensor at the process stations 122, 142. Smart sensors may be representative of a microprocessor controlled and hence susceptible to malware. A standard temperature sensor can include a thermocouple, RTD, or thermistor, for example. In practice, a standard sensor can fail causing abnormal behavior, can be replaced by an improper sensor by mistake, or can be replaced intentionally to disrupt the process. Deep learning processor 118, when trained on input operating instructions, output control signals, and control values, can predict abnormal behavior and indicate the source of the cause of the behavior. The model can be trained on any number of inputs as described herein.

Another model, such as a neural network, can determine the relationship between each of the inputs in the system as described herein.

In some embodiments, the station controller 120 can include one or more microprocessors. Since the station controller 120 is connected to a data processing server (e.g., 102), it can be determined that the station controller 120 is susceptible to possible malware attack. A possible mode of attack would be, for example, to alter the relationship between the input operating instructions and the control signal. An abnormality detected in this example would be indicative of a problem in the station controller 120.

In another example, the deep learning processor 118 can analyze the input operating instructions and output control signals and determines the relationship of these to an expected behavioral pattern data and the actual behavioral pattern data of the manufacturing process. In some instances, the relationship between input operating instructions and output control signal may be normal, and the comparison of the expected behavior pattern data and the actual behaviors pattern may be normal, however, comparing the input operating instructions, output control signals and an actual vs predicted behavior patterns may deviate from normal can indicate a process malfunction or possible malware.

Figure 2:
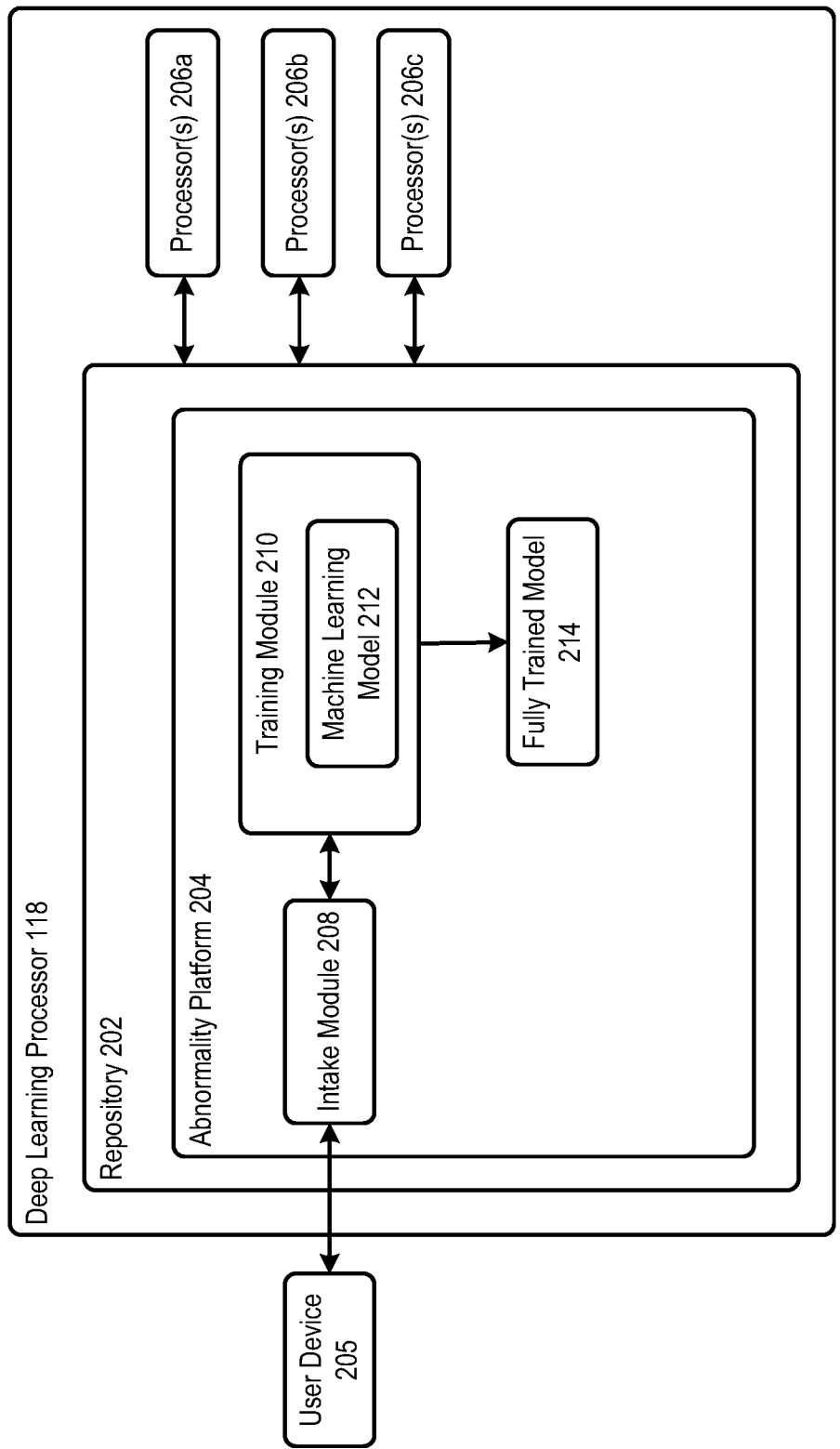
FIG. 2 is a block diagram illustrating a deep learning processor, according to example embodiments.

FIG. 2 is a block diagram illustrating a deep learning processor, according to example embodiments. As noted above, the deep learning processor 118 can be trained to detect based on input operating instructions and output control signals.

As shown in FIG. 2, the deep learning processor 118 can include a repository 202. The repository 202 can include one or more data storage nodes that may include instructions. The repository 202 can interact with processors 206a, 206b, and/or 206c to implement an abnormality platform 204 as described herein.

The abnormality platform 204 can train a model using a training data set to detect abnormalities in obtained signals. For example, an intake module 208 can obtain or receive a training data set from one or more user devices 205. The user device 205 can include a computing device, such as a computer, mobile phone, tablet, wearable electronic device, etc. The training data set can include at least two types of data for training a machine learning module. In some embodiments, the training data set can include a number of input operating instructions and corresponding output control signals. In some embodiments, the training data set can include input operating instructions and output control signals. The intake module 208 can feed the training data to a training module 210.

The training module 210 can train a machine learning model 212 using the training data set. For example, the machine learning model 212 can process the training data set to identify, for each input operating instruction, a range of expected values in output control signals. For instance, if the input operating instruction specifies an instruction to maintain a process station at 150 degrees Celsius, the machine learning model 212 can identify a range of voltages in corresponding output control signals that correspond to the input operating instruction. As another example, the machine learning model 212 can be trained to identify a range of expected measured metrics from the process station in response to an input operating instruction and/or an output control signal. Various machine learning techniques can be implemented to train the machine learning model 212. The training module 210 can output a fully trained model 214 for use in identifying anomalous signals as described herein.

The conditioning of the machine learning models of deep learning processor 118 can be achieved through unsupervised learning methods. Other than functional priors 138, experiential priors 139, universal inputs 136 that are input into deep learning processor 118, deep learning processor 118 draws inferences simply by analyzing the received data that it collects during the iteration of the manufacturing process. In other embodiments, deep learning processor 118 can be conditioned via supervised learning methods, or a combination of supervised and unsupervised methods or similar machine learning methods. Further, the training of deep learning processor 118 can be augmented by: providing deep learning processor 118 with simulated data or data from a similar manufacturing process. In some embodiments, deep learning processor 118 can be conditioned by implementing deep learning processor 118 into a similar manufacturing process and fine-tuning the deep learning processor during implementation in the target manufacturing process. That is, training of deep learning processor 118 can be performed using a training process that is performed before deep learning processor 118 is deployed into a target manufacturing environment.

Figure 3:
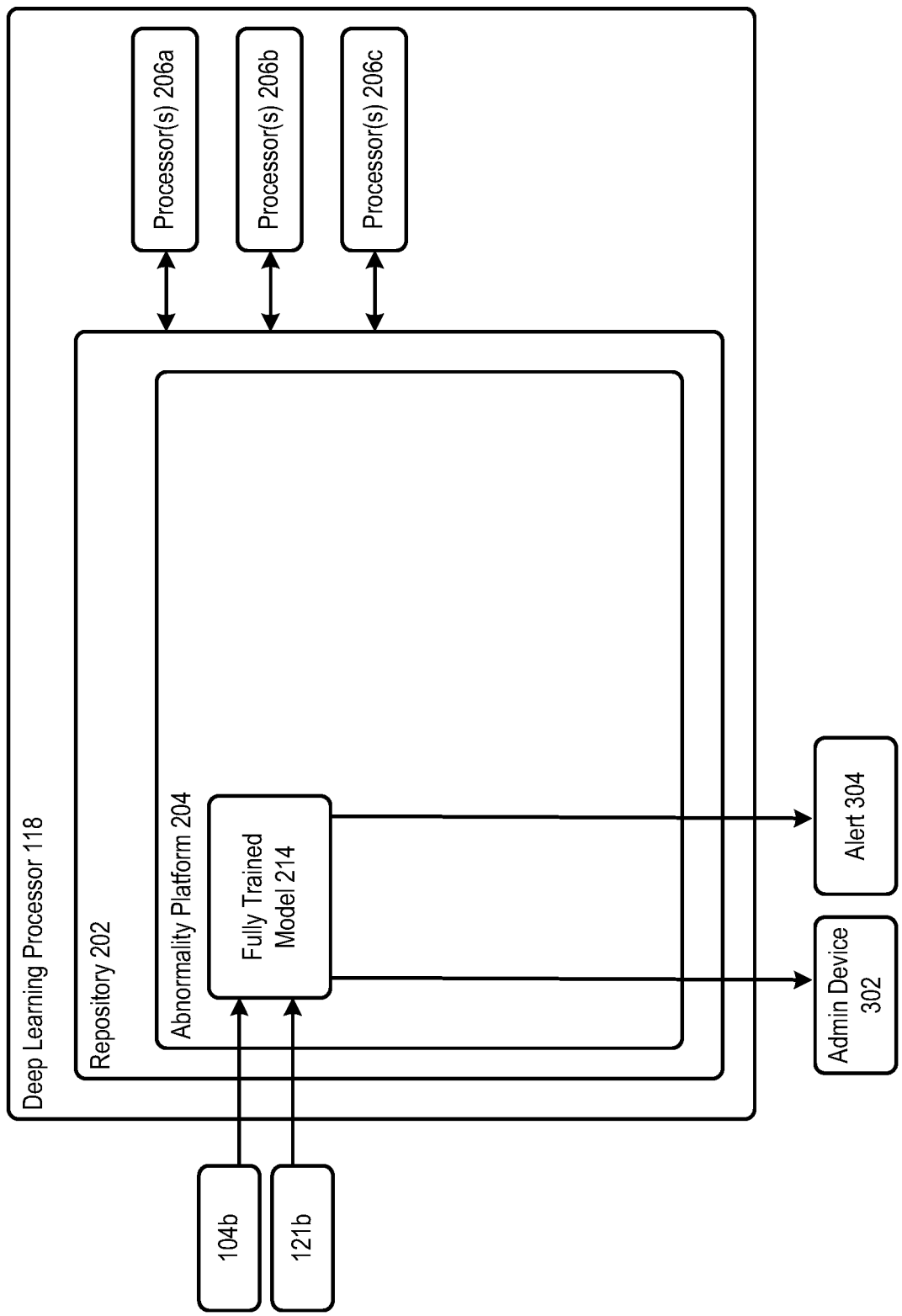
FIG. 3 is a block diagram illustrating a deep learning processor, according to example embodiments.

FIG. 3 is a block diagram illustrating a deep learning processor 118, according to example embodiments. As shown in FIG. 3, the abnormality platform 204 can obtain or receive duplicated instances of an input operating instruction (e.g., 104b) from a first splitter (e.g., 194) and an output control signal (e.g., 121b) from a second splitter (e.g., 192). While input operating instruction 104b and output control signal 121b are used as an example, any number of input operating instructions and output control signals can be provided to the deep learning processor 118.

The fully trained model 214 can process the inputs (e.g., 104b, 121b) and determine whether an abnormality exists. For example, the fully trained model 214 can correlate the input operating instructions and the output control signals to determine whether the output control signals are within a range of expected values.

Responsive to determining that the output control signal is outside of the range of values specified by the expected metric characteristics, an alert 304 can be generated. The alert 304 can specify various aspects of the anomalous signal, such as details relating to the input operating instruction 104b, output control signal 121b, a timestamp for identifying the anomalous signal, components (e.g., data processing server, controller) generating the signals, etc. In some instances, an admin device 302 can monitor the detection of abnormalities by the fully trained model 214 and modify various aspects of the detection of abnormalities.

In some embodiments, deep learning processor 118 may be further configured to suggest process changes to eliminate or reduce the severity of the detected abnormality.

Figure 4A:
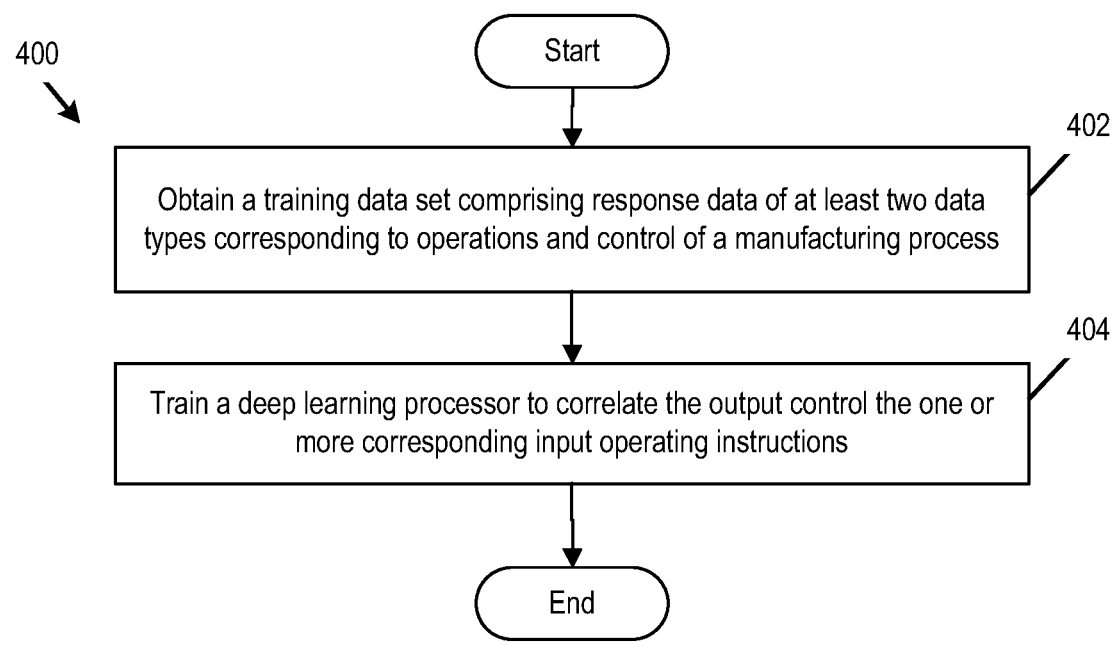
FIG. 4A is a flow diagram illustrating a method for training a deep learning process to detect anomalies between input operating instructions and output control signals, according to example embodiments.

FIG. 4A is a flow diagram 400 of an example method for training a deep learning processor 118 to detect or identify anomalies between input operating instructions and output control signals. A deep learning processor (e.g., 118) can perform the steps as described with respect to FIGS. 4A-4B.

At step 402, deep learning processor 118 may receive or obtain a training data set. The training data set can include response data of at least two data types that correspond to operations and control of a manufacturing process. For example, the training data set can include a series of example input operating instructions and corresponding output control signals. The training data set can be used to train the deep learning processor 118 as described herein.

At step 404, the deep learning processor 118 can be trained to correlate the output control signals with the input operating instructions to determine whether an anomaly exists. For example, if the input operating instruction is to maintain a temperature of 150 degrees Celsius at a process station 122, the expected output control signals can include a range of voltages acceptable for maintaining the temperature of process station 122 at 150 deg C. The deep learning processor 118 can process each input operating instruction and corresponding output control signal to determine whether an anomaly is present. The deep learning processor 118 can be continually or periodically trained to increase accuracy in identifying anomalies as described herein.

Figure 4B:
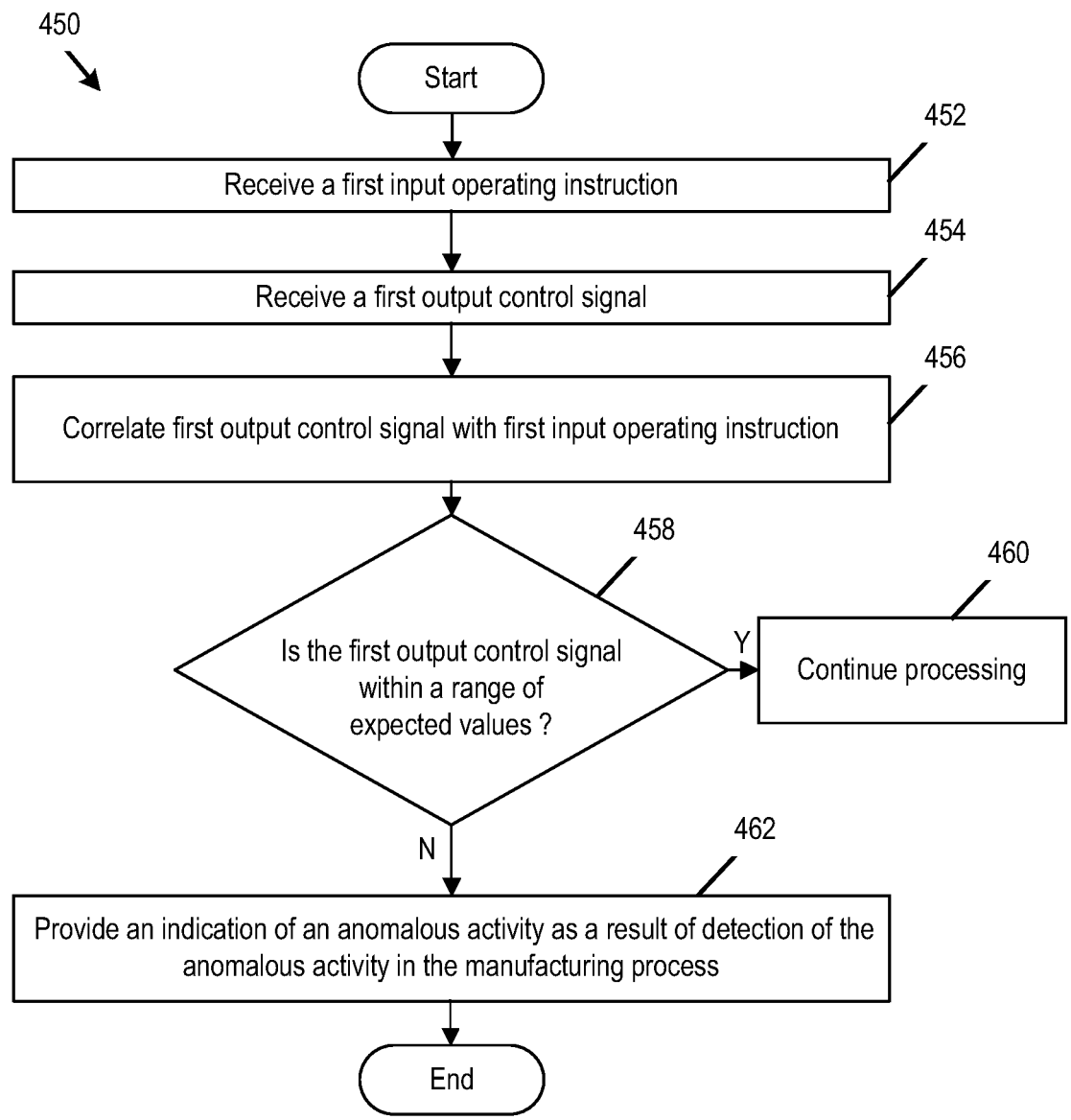
FIG. 4B is a flow diagram of an example method for identifying anomalies between input operating instructions and output control signals, according to example embodiments.

FIG. 4B is a flow diagram illustrating an example method 450 for identifying anomalies between input operating instructions and output control signals, according to example embodiments.

At step 452, the deep learning processor 118 can obtain a first input operating instruction 104b. The first input operating instruction can be a duplicated signal from a signal splitter, such as signal a from splitter 194, for example. The first input operating instruction can be sent from the data processing server 102 to a controller (e.g., 120) for controlling one or more aspects of a process station.

At step 454, the deep learning processor 118 can obtain a first output control signal 121b. The first output control signal can be a duplicated signal from a signal splitter, such as a signal from splitter 192, for example. The first output control signal can be sent from the controller (e.g., 120) to a process station (e.g., 122) for controlling one or more aspects of the process station.

At step 456, the deep learning processor 118 can correlate the first output control signal with the first input operating instruction. The trained deep learning processor 118 can determine a range of values predicted for the first input operating instruction. For example, a range of voltage values can be predicted as including appropriate values for the first input operating instruction.

At step 458, deep learning processor 118 may determine whether the first output control signal is within a range of expected values. The deep learning processor 118 can process the first output control signal to derive one or more metrics (e.g., voltages, instructions, signal type) in the signal and compare the metrics against a range of expected values based on the first input operating instructions. For example, the deep learning processor 118 can determine whether a voltage value for the first output control signal is outside the range of values expected for the input operating instruction.

If, at step 458, deep learning processor 118 determines that the first output control signal is within the range of expected values, then method 450 may proceed to step 460. At step 460, processing can continue.

If, at step 458, deep learning processor 118 determines that the first output control signal is outside the range of expected values, then method 450 may proceed to step 462. At step 462, deep learning processor 118 may generate an indication (e.g., an alert). The alert can specify an anomalous activity as a result of detection of the anomalous activity in the manufacturing process. The alert can identify various features of the output control signal, such as a device transmitting the output control signal, for example.

In some embodiments, an operator or algorithm can assign thresholds to the confidence levels associated with anomalous activities, as well as predefined actions to be performed when a threshold is met. For example, for the anomalous activities receiving a high confidence level score, immediate action can be prescribed, whereas with anomalous activities receiving lower confidence level scores, an operator can be prompted to review the anomalous activity before an action is taken. In one embodiment, the confidence levels can be divided into three intervals: high, medium and low, and a threshold can be assigned to each interval. Further, actions to be performed can be assigned to each interval. For example, for high confidence levels that fall into the high confidence interval an alert can be generated, for confidence levels that fall into the medium confidence interval, an operator can be prompted to review the anomalous activity, for confidence levels that fall into the low confidence level interval, the anomalous activity can be flagged and sporadically checked. The thresholds and interval ranges can be reviewed and adjusted to minimize false positives or false negatives.

In some embodiments, deep learning processor 118 can be configured to communicate with existing IT security systems to notify the systems of the anomalous activity. In further embodiments, deep learning processor 118 can be configured to communicate with a data logging module. This communication can provide alerts specifying the exact source of the malware attack and also be used to reconfigure firewall and other IT infrastructure to better defend the factory processes and equipment.

In some embodiments, deep learning processor 118 can be configured to communicate with the supply chain management system to alert a procurement or manufacturing source of an infected process component.

In some embodiments, deep learning processor 118 can be configured to communicate with the station or component that is the source for the anomalous activity and instruct the station or component to generate an alert via a coupled display or media system (e.g., a sound alert) that identifies the existence of anomalous activity, the source for the anomalous activity and/or the type of anomalous activity.

Figure 5:
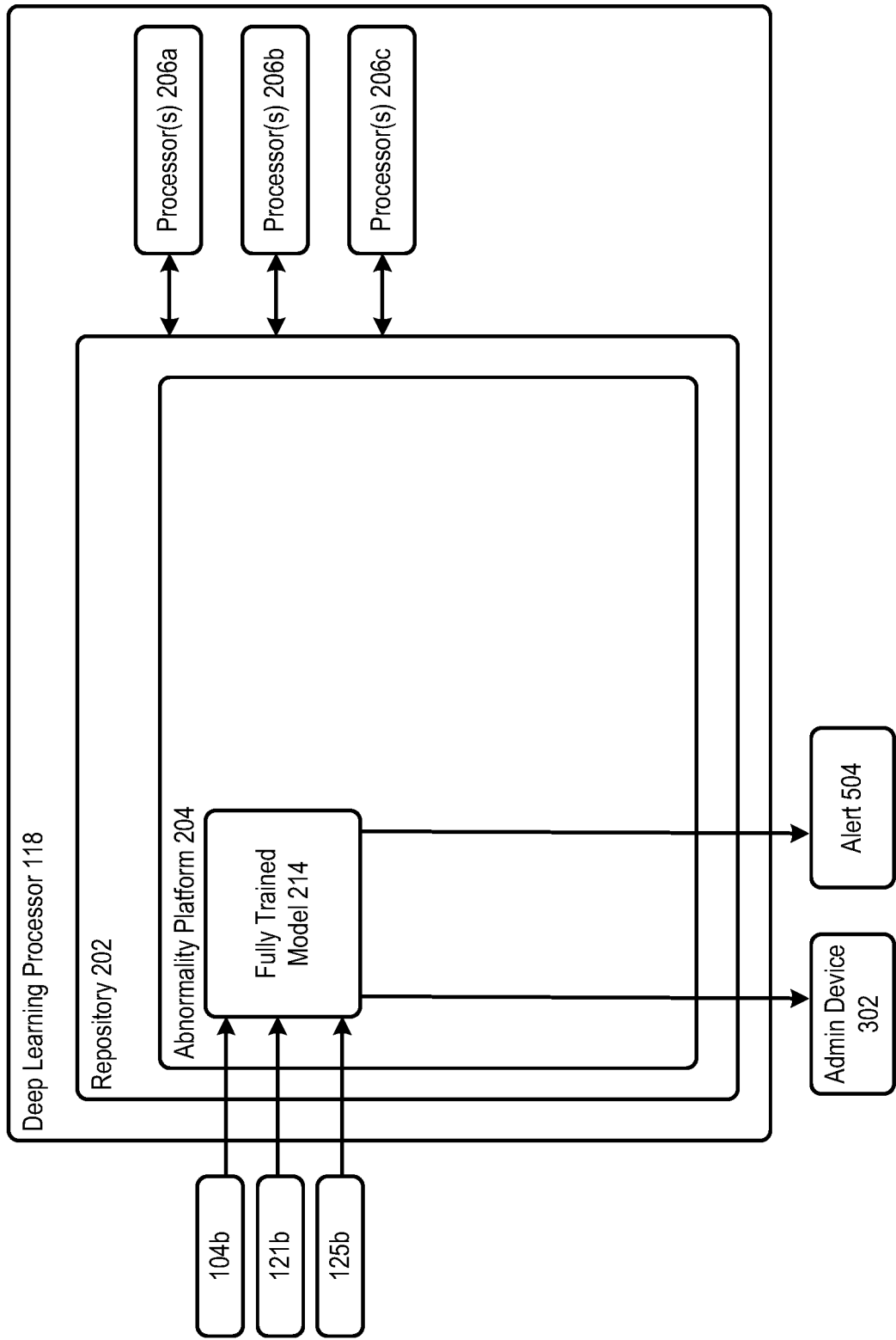
FIG. 5 is a block diagram illustrating a deep learning processor, according to example embodiments.

FIG. 5 is a block diagram illustrating a deep learning processor, according to example embodiments. As shown in FIG. 5, the abnormality platform 204 can obtain duplicated instances of an input operating instruction (e.g., 104b) from a first splitter (e.g., 194), an output control signal (e.g., 121b) from a second splitter (e.g., 192), and a measured control value (e.g., 125b) from a third splitter (e.g., 190). The set of measured control values (e.g., 125b) can be provided from one or more sensors at a process station (e.g., 122).

The fully trained model 214 can process the inputs (e.g., 104b, 121b, 125b) and determine whether an abnormality exists. For example, the fully trained model 214 can correlate the measured control values with the obtained input operating instruction and the output control signal. The measured control values can include metrics (e.g., temperature readings) measured from one or more sensors at the process station 122, 142 based on the input operating instructions (e.g., 104b, 108b) and the output control signals (e.g., 121b, 141b). If the measured control values (e.g., a measured temperature in the process station) are outside of the expected metrics, an alert 504 can be generated.

Figure 6A:
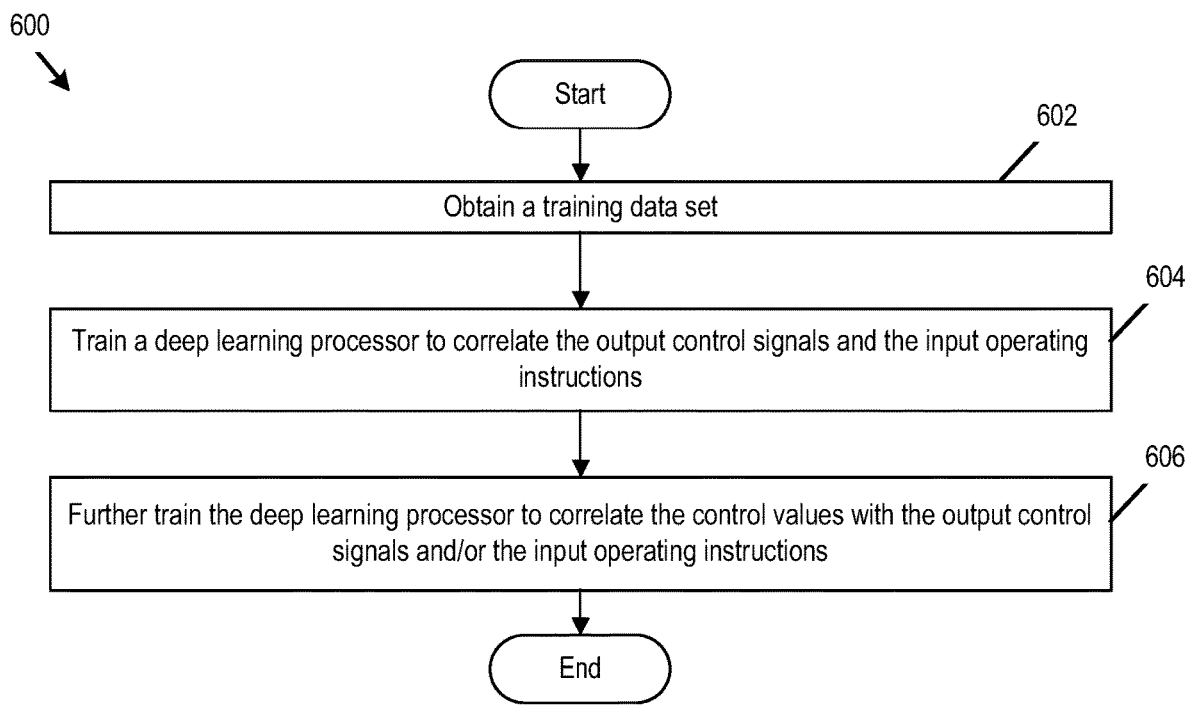
FIG. 6A is a flow diagram of an example method for training a deep learning processor to detect anomalies between input operating instructions, output control signals, and measured process station characteristics, according to example embodiments.

FIG. 6A is a flow diagram 600 of an example method for training deep learning processor 118 to detect or identify anomalies between input operating instructions, output control signals, and measured control values. A deep learning processor (e.g., 118) can perform the steps as described with respect to FIG. 6A.

At step 602, deep learning processor 118 can receive or obtain a training data set. The training data set can include a series of example input operating instructions, corresponding output control signals, and corresponding measured control values. The training data set can be used to train the deep learning processor 118 as described herein.

At step 604, the deep learning processor 118 can be trained to correlate input operating instructions, output control signals, and measured control values. The training can include training as described with respect to step 404 in FIG. 4A. In some embodiments, the training can include predicting a range of values measured from the process station based on specific output control signals and/or input operating instructions.

At step 606, deep learning processor 118 may be further trained to correlate the control values with the output signals and/or the input operating instructions.

Figure 6B:
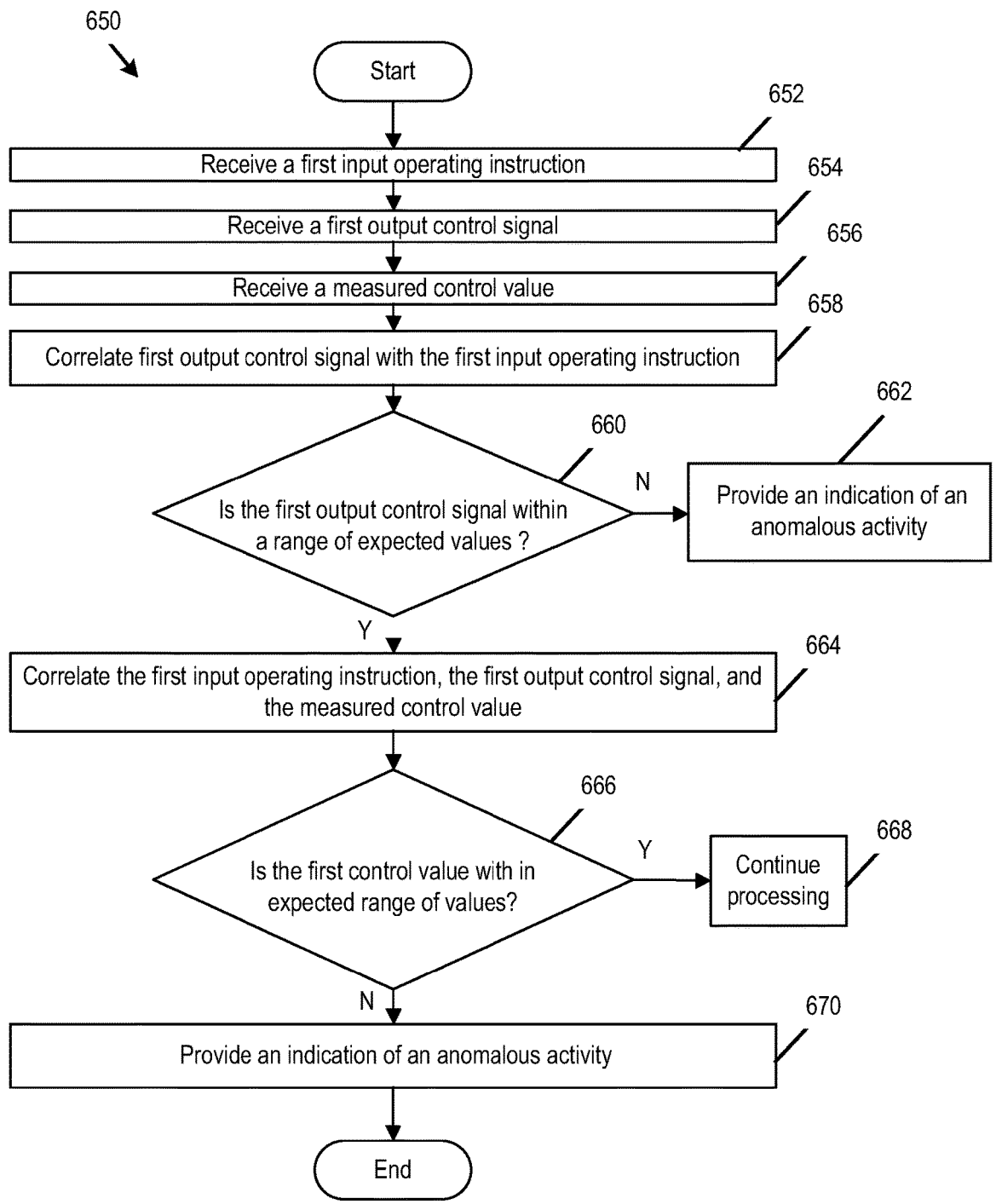
FIG. 6B is a flow diagram of an example method for identifying anomalies between input operating instructions, output control signals, and measured process station characteristics, according to example embodiments.

FIG. 6B is a flow diagram illustrating an example method 650 for identifying anomalies between input operating instructions, output control signals, and control values. A deep learning processor (e.g., 118) can perform the steps as described with respect to FIG. 6A.

At step 652, deep learning processor 118 can obtain a first input operating instruction 104b. The first input operating instruction can be a duplicated signal from a signal splitter, such as signal from splitter 194, for example. The first input operating instruction can be sent from the data processing server 102 to a controller (e.g., 120) for controlling one or more aspects of a process station.

At step 654, the deep learning processor can obtain a first output control signal. The first output control signal can be a duplicated signal from a signal splitter, such as signal 121b from splitter 192, for example. The first output control signal can be sent from the controller (e.g., 120) to a process station (e.g., 122) for controlling one or more aspects of the process station.

At step 656, the deep learning processor 118 can obtain a measured control value. For example, the measured control value can include metrics measured from one or more sensors at a process station. The measured control value can be obtained at deep learning processor 118 from splitter 190 duplicating the first set of measured process station characteristics.

At step 658, the deep learning processor 118 can correlate the first output control signal with the first set of measured process station characteristics (e.g., similar to step 456 of FIG. 4B).

At step 660, deep learning processor 118 may determine whether the first output control signal is within a range of values specified by the expected metric characteristics (e.g., similar to step 458 of FIG. 4B). If, at step 660, deep learning processor 118 determines that the first output control signal is outside the range of values specified by the expected metric characteristics, then at step 662, deep learning processor 118 may generate an indication (e.g., an alert). The alert can specify an anomalous activity as a result of detection of the anomalous activity in the manufacturing process. The alert can identify various features of the output control signal, such as a device transmitting the output control signal, for example.

If, however, at step 660, deep learning processor 118 determines that the first output control signal is within the range of values specified by the expected metrics, then method 650 may proceed to step 664.

At step 664, deep learning processor 118 may correlate the first input operating instruction, the first output control signal, and the first control value. For example, there may be a scenario where a correlation between the first input operating instruction and the first output control signal does not indicate an anomalous activity, but correlation of the first input operating instruction, the first output operations instruction, and the first control value does indicate an anomalous activity.

At step 666, deep learning processor 118 can determined whether the first control value is within a range of expected values by the input operating instruction and the output control signal.

If, at step 666, deep learning processor 118 determines that the first set of measured process station characteristics are within a range of values specified by the expected process station metric characteristics, method 650 may proceed to step 668. At step 668, processing can continue.

If, at step 666, deep learning processor 118 determines that the first control value is not within a range of expected values based on the input operating instructions and the output control signals, method 650 may proceed to step 670. At step 670, deep learning processor 118 may generate an indication (e.g., an alert). The alert can specify an anomalous activity as a result of detection of the anomalous activity in the manufacturing process.

Figure 7:
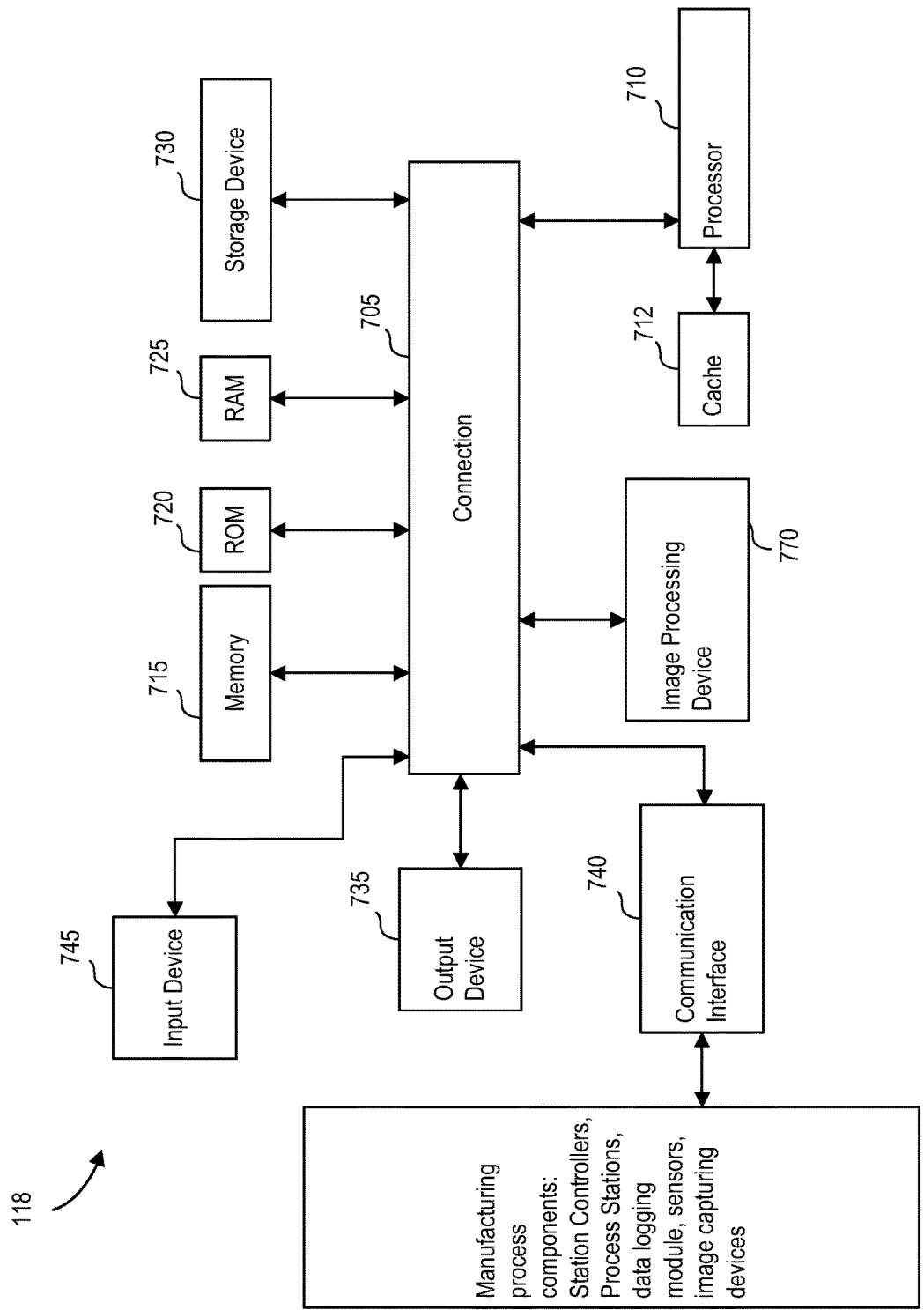
FIG. 7 shows an illustrative example of a computing system architecture including various components in electrical communication with each other using a connection in accordance with various embodiments.

FIG. 7 shows the general configuration of an embodiment of deep learning processor 118 that can implement dynamic monitoring and securing of factory processes, equipment and automated systems, in accordance with some embodiments of the disclosed subject matter. Although deep learning processor 118 is illustrated as a localized computing system in which various components are coupled via a bus 705, it is understood that various components and functional computational units (modules) can be implemented as separate physical or virtual systems. For example, one or more components and/or modules can be implemented in physically separate and remote devices, such as, using virtual processes (e.g., virtual machines or containers) instantiated in a cloud environment.

Deep learning processor 118 can include a processing unit (e.g., CPU/s and/or processor/s) 710 and bus 705 that couples various system components including system memory 715, such as read only memory (ROM) 720 and random access memory (RAM) 725, to processor 710. Processor 710 can include one or more processors such as a processor from the Motorola family of microprocessors or the MIPS family of microprocessors. In an alternative embodiment, the processor 710 can be specially designed hardware for controlling the operations of deep learning processor 118 and performing predictive process control. When acting under the control of appropriate software or firmware, processor 710 can perform various machine learning algorithms and computations described herein.

Memory 715 can include various memory types with different performance, characteristics, such as memory cache 712. Processor 710 can be coupled to storage device 730, which can be configured to store software and instructions necessary for implementing one or more functional modules and/or database systems. Each of these modules and/or database systems can be configured to control processor 710 as well as a special-purpose processor where software instructions are incorporated into the actual processor design.

To enable operator interaction with deep learning processor 118, input device 745 can represent any number of input mechanisms, such as a microphone for speech, a touch-sensitive screen for gesture or graphical input, keyboard, mouse, motion input and so forth. An output device 735 can also be one or more of a number of output mechanisms (e.g., printer, monitor) known to those of skill in the art. In some instances, multimodal systems can enable an operator to provide multiple types of input to communicate with deep learning processor 118. Communications interface 740 can generally govern and manage the operator input and system output, as well as all electronic input received from and sent to other components that are part of a manufacturing process such as the station controllers, process stations, data logging module, and all associated sensors and image capturing devices. There is no restriction on operating on any particular hardware arrangement and therefore the basic features here may easily be substituted for improved hardware or firmware arrangements as they are developed. Data output from deep learning processor 118 can be displayed visually, printed, or generated in file form and stored in storage device 730 or transmitted to other components for further processing.

Communication interface 740 can be provided as interface cards (sometimes referred to as "line cards"). Generally, they control the sending and receiving of data packets over the network and sometimes support other peripherals used with the router. Among the interfaces that can be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow processor 710 to efficiently perform machine learning and other computations necessary to implement predictive process control. Communication interface 740 can be configured to communicate with the other components that are part of a manufacturing process such as the station controllers, process stations, data logging module, and all associated sensors and image capturing devices.

In some embodiments, deep learning processor 118 can include an imaging processing device 770 that processes images received by various image capturing devices such as video cameras, that are coupled one or more processing station and are capable of monitoring and capturing images of intermediate and final outputs. These images can be transmitted to deep learning processor 118 via communication interface 740, and processed by image processing device 770. The images can be processed to provide data, such as number and type of defects, output dimensions, throughput, that can be used by deep learning processor 118 to compute intermediate and final output values. In some embodiments, the image processing device can be external to deep learning processor 118 and provide information to deep learning processor 118 via communication interface 740.

Storage device 730 is a non-transitory memory and can be a hard disk or other types of computer readable media that can store data accessible by a computer, such as magnetic cassettes, flash memory cards, solid state memory devices, digital versatile disks, cartridges, random access memories (RAMs) 725, read only memory (ROM) 720, and hybrids thereof.

In practice, storage device 730 can be configured to receive, store and update input data to and output data from deep learning processor 118, for example functional priors, experiential priors, universal input; pre-process inputs; in-process inputs and post-process inputs.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable media described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for detecting unexpected activity in a manufacturing environment, comprising:
   receiving, by a deep learning processor deployed in a manufacturing environment from a first signal splitter disposed between a data processing server and a first controller in the manufacturing environment, a first duplicated input signal instance of a first input operating instruction generated by the data processing server, wherein the first signal splitter generates the first duplicated input signal instance of the first input operating instruction and a second duplicated input signal instance of the first input operating instruction;
   receiving, by the deep learning processor from a second signal splitter disposed between the first controller and a first process station in the manufacturing environment, a first output control signal generated by the first controller;
   receiving, by the deep learning processor from a third signal splitter disposed between the first process station and the first controller, a control value measured by a sensor at the first process station;
   correlating, by the deep learning processor, the first input operating instruction and the first output control signal;
   based on the correlating, determining, by the deep learning processor, that the first output control signal is within a range of expected values based on the first input operating instruction;
   further correlating, by the deep learning processor, the first input operating instruction, the first output control signal, and the control value;
   based on the further correlating, determining, by the deep learning processor, that the control value is not within a range of expected control values; and
   responsive to determining that the control value is not within the range of expected control values, providing an indication of an unexpected activity.

2. The method of claim 1, wherein the first signal splitter forwards the second duplicated input signal instance to the first controller.

3. The method of claim 1, further comprising:
   generating a suggested action to eliminate or address the unexpected activity.

4. The method of claim 1, wherein providing the indication of the unexpected activity comprises:
   determining a component in the manufacturing environment that triggered the unexpected activity; and
   flagging the component in the indication of the unexpected activity.

5. The method of claim 1, wherein determining, by the deep learning processor, that the control value is not within the range of expected control values comprises:
   identifying components of the control value that are not within the range of expected components of the expected control values.

6. The method of claim 5, wherein providing the indication of the unexpected activity comprises:
   generating an alert specifying the components of the control value.

7. The method of claim 1, further comprising:
   generating a confidence level associated with a determination that the control value is not within the range of expected control values.

8. A non-transitory computer readable medium comprising one or more sequences of instructions, which, when executed by a processor, causes a computing system to perform operations comprising:
   receiving, by a deep learning processor deployed in a manufacturing environment from a first signal splitter disposed between a data processing server and a first controller in the manufacturing environment, a first duplicated input signal instance of a first input operating instruction generated by the data processing server, wherein the first signal splitter generates the first duplicated input signal instance of the first input operating instruction and a second duplicated input signal instance of the first input operating instruction;
   receiving, by the deep learning processor from a second signal splitter disposed between the first controller and a first process station in the manufacturing environment, a first output control signal generated by the first controller;
   receiving, by the deep learning processor from a third signal splitter disposed between the first process station and the first controller, a control value measured by a sensor at the first process station;
   correlating, by the deep learning processor, the first input operating instruction and the first output control signal;
   based on the correlating, determining, by the deep learning processor, that the first output control signal is within a range of expected values based on the first input operating instruction;
   further correlating, by the deep learning processor, the first input operating instruction, the first output control signal, and the control value;
   based on the further correlating, determining, by the deep learning processor, that the control value is not within a range of expected control values; and
   responsive to determining that the control value is not within the range of expected control values, providing an indication of an unexpected activity.

9. The non-transitory computer readable medium of claim 8, wherein the first signal splitter forwards the second duplicated input signal instance to the first controller.

10. The non-transitory computer readable medium of claim 8, further comprising:
    generating a suggested action to eliminate or address the unexpected activity.

11. The non-transitory computer readable medium of claim 8, wherein providing the indication of the unexpected activity comprises:
    determining a component in the manufacturing environment that triggered the unexpected activity; and
    flagging the component in the indication of the unexpected activity.

12. The non-transitory computer readable medium of claim 8, wherein determining, by the deep learning processor, that the control value is not within the range of expected control values comprises:
    identifying components of the control value that are not within the range of expected components of the expected control values.

13. The non-transitory computer readable medium of claim 12, wherein providing the indication of the unexpected activity comprises:
generating an alert specifying the components of the control value.

14. The non-transitory computer readable medium of claim 8, further comprising:
generating a confidence level associated with a determination that the control value is not within the range of expected control values.

15. A system comprising:
a deep learning processor; and
a memory having programming instructions stored thereon, which, when executed by the deep learning processor, causes the system to perform operations comprising:
receiving, by the deep learning processor deployed in a manufacturing environment from a first signal splitter disposed between a data processing server and a first controller in the manufacturing environment, a first duplicated input signal instance of a first input operating instruction generated by the data processing server, wherein the first signal splitter generates the first duplicated input signal instance of the first input operating instruction and a second duplicated input signal instance of the first input operating instruction;
receiving, by the deep learning processor from a second signal splitter disposed between the first controller and a first process station in the manufacturing environment, a first output control signal generated by the first controller;
receiving, by the deep learning processor from a third signal splitter disposed between the first process station and the first controller, a control value measured by a sensor at the first process station;
correlating, by the deep learning processor, the first input operating instruction and the first output control signal;
based on the correlating, determining, by the deep learning processor, that the first output control signal is within a range of expected values based on the first input operating instruction;
further correlating, by the deep learning processor, the first input operating instruction, the first output control signal, and the control value;
based on the further correlating, determining, by the deep learning processor, that the control value is not within a range of expected control values; and
responsive to determining that the control value is not within the range of expected control values, providing an indication of an unexpected activity.

16. The system of claim 15, wherein the first signal splitter forwards the second duplicated input signal instance to the first controller.

17. The system of claim 15, wherein the operations further comprise:
generating a suggested action to eliminate or address the unexpected activity.

18. The system of claim 15, wherein providing the indication of the unexpected activity comprises:
determining a component in the manufacturing environment that triggered the unexpected activity; and
flagging the component in the indication of the unexpected activity.

19. The system of claim 15, wherein determining, by the deep learning processor, that the control value is not within the range of expected control values comprises:
identifying components of the control value that are not within the range of expected components of the expected control values; and
generating an alert specifying the components of the control value.

20. The system of claim 15, wherein the operations further comprise:
generating a confidence level associated with a determination that the control value is not within the range of expected control values.

* * * * *